US012606034B2

(12) United States Patent (10) Patent No.: US 12,606,034 B2
Yokoyama et al. (45) Date of Patent: Apr. 21, 2026

(54) CONTACTLESS POWER FEED SYSTEM, GROUND POWER FEED DEVICE, AND CONTACTLESS POWER FEED METHOD

(71) Applicant: TOYOTA JIDOSHA KABUSHIKI KAISHA, Aichi-ken (JP)

(72) Inventors: Daiki Yokoyama, Gotemba (JP); Toshiya Hashimoto, Miyoshi (JP); Shuntaro Okazaki, Shizuoka-ken (JP); Shogo Tsuge, Fuji (JP); Kazuhisa Matsuda, Shizuoka-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 637 days.

(21) Appl. No.: 18/194,653

(22) Filed: Apr. 3, 2023

(65) Prior Publication Data

US 2023/0322091 A1 Oct. 12, 2023

(30) Foreign Application Priority Data

Apr. 6, 2022 (JP) ................................. 2022-063565

(51) Int. Cl.
| | |
|---|---|
| *B60L 53/12* | (2019.01) |
| *B60L 5/00* | (2006.01) |
| *B60L 53/38* | (2019.01) |
| *B60L 53/39* | (2019.01) |
| *B60L 53/60* | (2019.01) |
| *B60L 53/68* | (2019.01) |
| *H02J 50/12* | (2016.01) |
| *H02J 50/80* | (2016.01) |

(52) U.S. Cl.
CPC .............. *B60L 53/12* (2019.02); *B60L 5/005* (2013.01); *B60L 53/38* (2019.02); *B60L 53/39* (2019.02); *B60L 53/60* (2019.02); *B60L 53/68* (2019.02); *H02J 50/12* (2016.02); *H02J 50/80* (2016.02)

(58) Field of Classification Search
CPC .......... B60L 5/005; B60L 53/12; B60L 53/38; B60L 53/39; B60L 53/60; B60L 53/65; B60L 53/68; H02J 50/12; H02J 50/80
See application file for complete search history.

(56) References Cited

U.S. PATENT DOCUMENTS

| | | | |
|---|---|---|---|
| 2022/0294277 A1* | 9/2022 | Wolgemuth | .......... B60L 53/126 |
| 2023/0219447 A1* | 7/2023 | Ehara | ...................... B60L 53/68 |
| 2024/0118096 A1* | 4/2024 | Kundu | .................... B60L 53/12 |

FOREIGN PATENT DOCUMENTS

| | | | | |
|---|---|---|---|---|
| EP | 2541730 A1 * | 1/2013 | .......... H02J 7/00034 |
| JP | 2018-157686 A | 10/2018 | |

* cited by examiner

*Primary Examiner* — David V Henze-Gongola
(74) *Attorney, Agent, or Firm* — HAUPTMAN HAM, LLP

(57) ABSTRACT

A contactless power feed system includes a first ground power feed device and a second ground power feed device for performing contactless power feed to a moving body. The first ground power feed device transmits a passing signal to the second ground power feed device when entry of the moving body to a first power feed section is confirmed. The second ground power feed device transmits a power feed stop signal to the first ground power feed device when confirmation of entry or approach of the moving body to a second power feed section is not possible even after a predetermined time has elapsed after receiving the passing signal.

6 Claims, 7 Drawing Sheets

Figure 7:
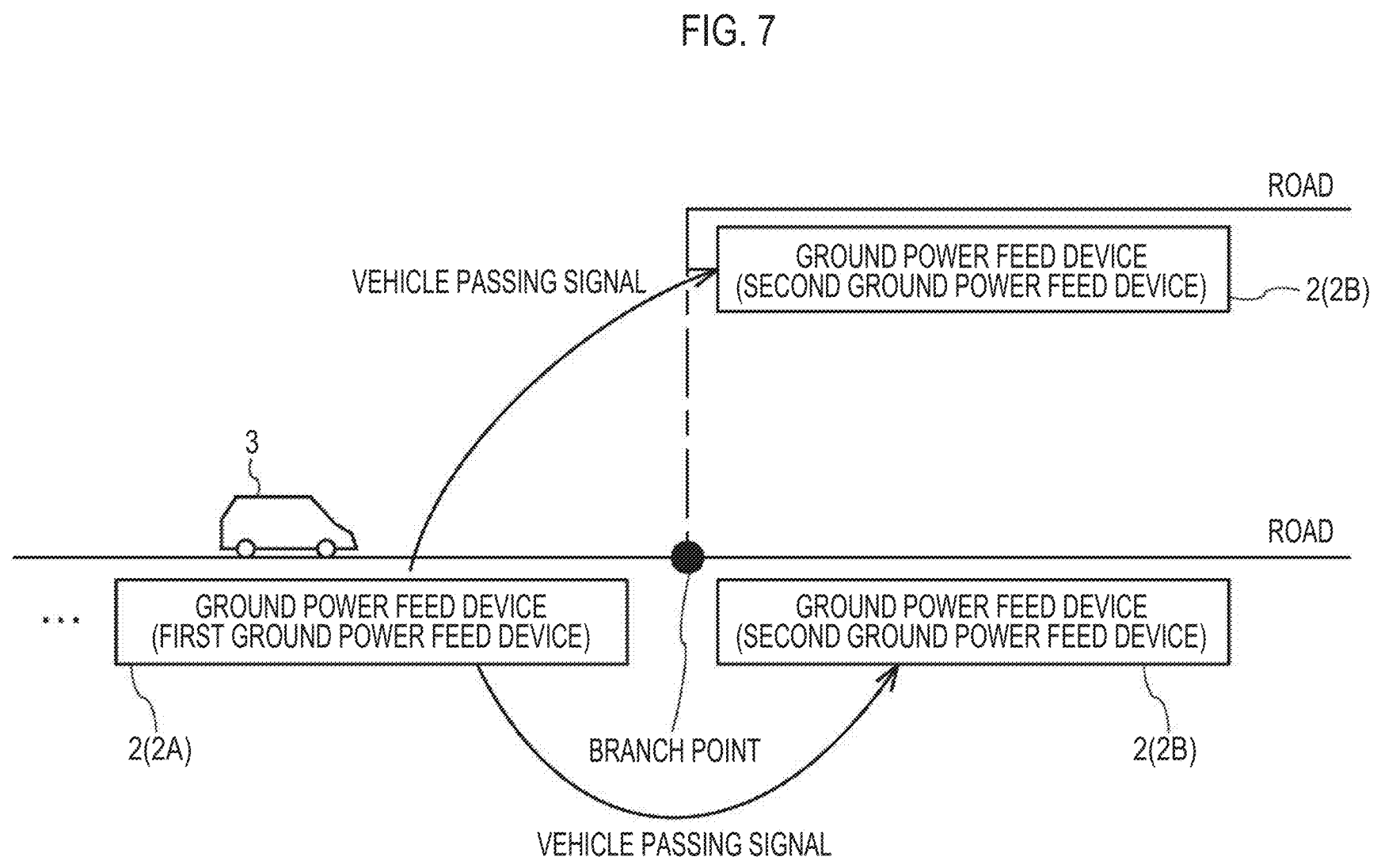

ROAD

ROAD

GROUND POWER FEED DEVICE
(SECOND GROUND POWER FEED DEVICE)          2(2B)

GROUND POWER FEED DEVICE
(SECOND GROUND POWER FEED DEVICE)          2(2B)

GROUND POWER FEED DEVICE
(FIRST GROUND POWER FEED DEVICE)          2(2A)

VEHICLE PASSING SIGNAL

VEHICLE PASSING SIGNAL

BRANCH POINT

3

CONTACTLESS POWER FEED SYSTEM, GROUND POWER FEED DEVICE, AND CONTACTLESS POWER FEED METHOD

CROSS-REFERENCE TO RELATED APPLICATION

This application claims priority to Japanese Patent Application No. 2022-063565 filed on Apr. 6, 2022, incorporated herein by reference in its entirety.

BACKGROUND

1. Technical Field

The present disclosure relates to a contactless power feed system, a ground power feed device, and a contactless power feed method.

2. Description of Related Art

Japanese Unexamined Patent Application Publication No. 2018-157686 (JP 2018-157686 A) discloses a contactless power feed system for transmitting power to a traveling vehicle without contact from a ground power feed device installed on the ground by using a transmission method such as magnetic field coupling (electromagnetic induction), electric field coupling, magnetic resonance coupling (magnetic field resonance), and electric field resonance coupling (electric field resonance).

SUMMARY

On a road where a ground power feed device is installed, a vehicle may be difficult to move due to some factor such as vehicle failure. In the case described above, when power transmission from the ground power feed device to the vehicle continues, for example, there is a likeliness that, when an occupant gets off the vehicle, the occupant is directly exposed to a leakage magnetic field generated during power transmission.

The present disclosure provides a contactless power feed system, a ground power feed device, and a contactless power feed method capable of stopping power transmission from the ground power feed device to a vehicle when the vehicle gets into a state of being difficult to move on a road where the ground power feed device is installed.

A first aspect of the present disclosure relates to a contactless power feed system including a first ground power feed device and a second ground power feed device configured to perform contactless power feed to a moving body. The second ground power feed device is a ground power feed device that has a possibility of performing the contactless power feed to the moving body subsequent to the first ground power feed device, and the first ground power feed device is configured to transmit, to the second ground power feed device, a passing signal informing about passage of the moving body when entry of the moving body to a first power feed section in which the contactless power feed is performed by the first ground power feed device is confirmed. The second ground power feed device is configured to transmit, to the first ground power feed device, a power feed stop signal for stopping the contactless power feed in the first power feed section when confirmation of entry or approach of the moving body to a second power feed section in which the contactless power feed is performed by the second ground power feed device is not possible even after a predetermined time has elapsed after receiving the passing signal.

In the first aspect of the present disclosure, the predetermined time may be set based on a distance of the first power feed section.

In the first aspect of the present disclosure, the predetermined time may be set based on a statistical value of a time taken for a plurality of the moving bodies that has traveled in the first power feed section in past times to travel through the first power feed section.

In the first aspect of the present disclosure, the first ground power feed device may be configured to stop the contactless power feed in the first power feed section when the power feed stop signal is received.

A second aspect of the present disclosure relates to a ground power feed device that performs contactless power feed to a moving body. The ground power feed device includes a processor. The processor is configured to receive a passing signal informing about passage of the moving body from another ground power feed device behind in a traveling direction of the moving body, and when the passing signal is received from the other ground power feed device, transmit, to the other ground power feed device, a power feed stop signal for stopping the contactless power feed when confirmation of entry or approach of the moving body to a power feed section is not possible even after a predetermined time has elapsed after receiving the passing signal.

A third aspect of the present disclosure relates to a contactless power feed method. The contactless power feed method is executed by a first ground power feed device configured to perform contactless power feed on a moving body and a second ground power feed device that is a ground power feed device that has a possibility of performing the contactless power feed to the moving body subsequent to the first ground power feed device. The contactless power feed method includes transmitting a passing signal informing about passage of the moving body from the first ground power feed device to the second ground power feed device when entry of the moving body to a first power feed section in which the contactless power feed is performed by the first ground power feed device is confirmed, transmitting, when the second ground power feed device receives the passing signal from the first ground power feed device, a power feed stop signal for stopping the contactless power feed from the second ground power feed device to the first ground power feed device when confirmation of entry or approach of the moving body to a second power feed section in which the contactless power feed is performed by the second ground power feed device is not possible even after a predetermined time has elapsed after receiving the passing signal, and stopping the contactless power feed in the first power feed section when the first ground power feed device receives the power feed stop signal from the second ground power feed device.

According to the aspects of the present disclosure, it is possible to, when a moving body gets into a state of being difficult to move due to some factor, determine the state and stop power transmission from the ground power feed device to the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a diagram illustrating an example of a configuration of a ground power feed device;

FIG. 3 is a diagram illustrating an example of a configuration of a vehicle;

FIG. 7 is a diagram illustrating a state in which the vehicle is stopped due to a failure on the electrified road and gets into a state of being difficult to move in front of a branch point.

DETAILED DESCRIPTION OF EMBODIMENTS

Figure 1:
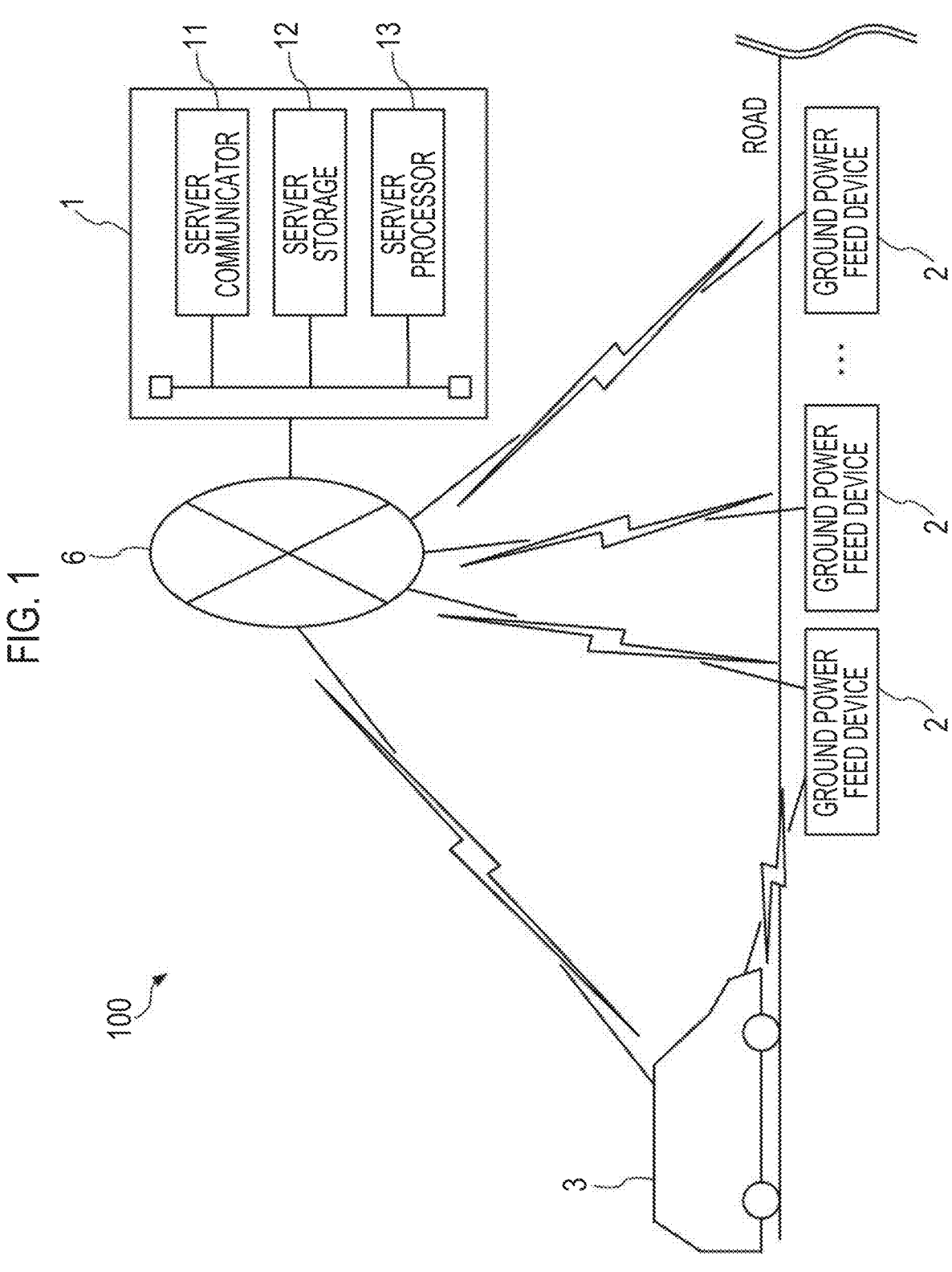
FIG. 1 is a schematic configuration diagram of a contactless power feed system.

Hereinafter, embodiments will be described in detail with reference to the drawings. In the following description, the same reference numerals are given to the same constituent elements.

First Embodiment

FIG. 1 is a schematic configuration diagram of a contactless power feed system 100 according to a first embodiment of the present disclosure.

The contactless power feed system 100 includes a server 1, ground power feed devices 2, and a vehicle 3, which is an example of a moving body, and is configured to execute contactless power transmission (contactless power feed) by magnetic resonance coupling (magnetic field resonance) from the ground power feed device 2 to the vehicle 3. FIG. 1 illustrates an example of installation of the ground power feed devices 2, where the ground power feed devices 2 are set continuously at predetermined intervals along a road by way of example. In the following description, the road where the ground power feed devices 2 are installed will be referred to as an "electrified road" as needed.

As illustrated in FIG. 1, the server 1 includes a server communicator 11, a server storage 12, and a server processor 13.

The server communicator 11 includes a communication interface circuit for connecting the server 1 to a network 6 and is configured to communicate with the ground power feed devices 2 and the vehicle 3 through the network 6.

The server storage 12 includes a storage medium such as a hard disk drive (HDD), a solid state drive (SSD), an optical recording medium, or a semiconductor memory, and stores various computer programs, data, or the like, used for processing in the server processor 13.

The server processor 13 includes one or more central processing units (CPUs) and peripheral circuits thereof. The server processor 13 executes various computer programs stored in the server storage 12 to integrally control the overall operation of the server 1, and is, for example, a processor.

When the server processor 13 and thus the server 1 receive a use request signal of the contactless power feed system 100 from the vehicle 3, the server 1 checks whether or not the vehicle 3 is authorized to use the system, and when the check has been completed, exchanges various information with the vehicle 3 and the ground power feed device 2 such that the vehicle 3 can receive power feed from the ground power feed devices 2. The details of the exchange will be described later with reference to FIG. 4.

Figure 2:
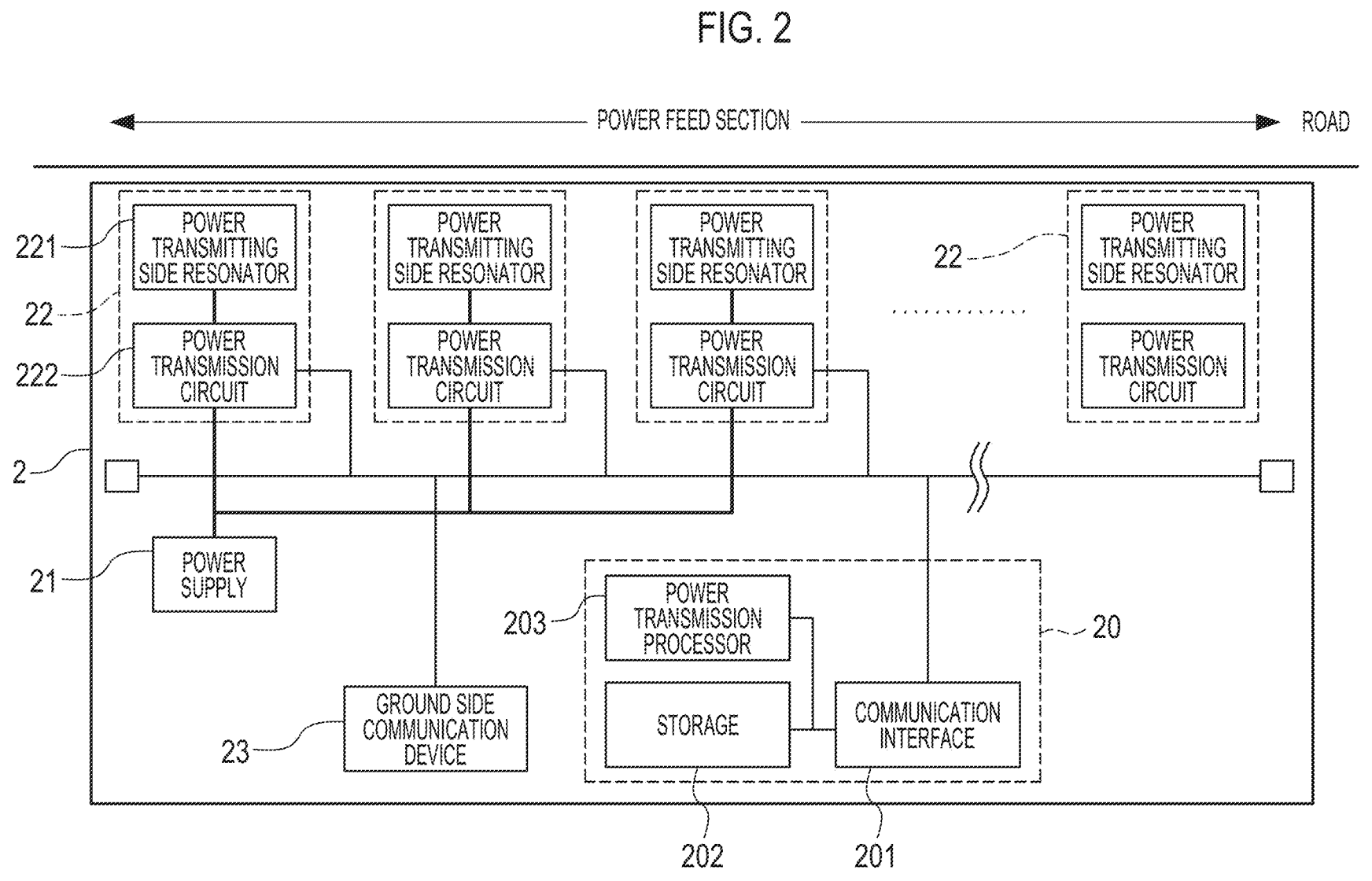

Next, a configuration of the ground power feed device 2 and the vehicle 3 according to the present embodiment will be described with reference to FIGS. 2 and 3. FIG. 2 is a diagram illustrating an example of the configuration of the ground power feed device 2 according to the present embodiment.

As illustrated in FIG. 2, the ground power feed device 2 includes a power supply 21, a power transmitting device 22, a ground side communication device 23, and a power transmission control device 20. The power transmitting device 22 and the ground side communication device 23 are connected to the power transmission control device 20 through an internal network 24 of the ground power feed device 2 conforming to standards, such as a controller area network (CAN). Although FIG. 2 illustrates an example in which the ground power feed device 2 includes a plurality of power transmitting devices 22, the number of power transmitting devices 22 may be one.

The power supply 21 supplies power to the power transmitting device 22. The power supply 21 is, for example, a commercial alternate current power supply that supplies single-phase alternate current power. The power supply 21 may be another alternate current power supply that supplies three-phase alternate current power, or may be a direct current power supply such as a fuel cell. Further, although FIG. 2 illustrates an example in which power is supplied to each power transmitting device 22 by the common power supply 21, power may be supplied by preparing a dedicated power supply for each power transmitting device.

The power transmitting device 22 is a device for transmitting power supplied from the power supply 21 to the vehicle 3 and includes a power transmitting side resonator 221 and a power transmission circuit 222.

The power transmitting side resonator 221 is a resonance circuit including a power transmitting coil, and is configured to resonate at a predetermined resonance frequency $f_0$. In the present embodiment, the resonance frequency $f_0$ is set to 85 [kHz] defined by the SAETIR J2954 standard as a frequency band for contactless power transmission, but is not limited thereto.

As will be described later with reference to FIG. 3, the vehicle 3 is provided with a power receiving side resonator 311 corresponding to the power transmitting side resonator 221. The power receiving side resonator 311 is a resonance circuit including a power receiving coil, and is configured to resonate at the same resonance frequency $f_0$ as the power transmitting side resonator 221. By resonating the power transmitting side resonator 221, the power transmitting coil of the power transmitting side resonator 221 and the power receiving coil of the power receiving side resonator 311, which are arranged with a space therebetween, are magnetically coupled, whereby contactless power transmission from the power transmitting device 22 to the power receiving device 31 is performed. Therefore, a section in which the power transmitting device 22 is installed becomes the power feed section in which contactless power feed is performed by the ground power feed device 2.

The power transmission circuit 222 is an electric circuit that includes a rectifier and an inverter, and is configured to be controlled by the power transmission control device 20 to be able to convert alternate current power supplied from the power supply 21 into direct current power by the rectifier and convert the direct current power into desired alternate current power that can resonate the power transmitting side resonator 221 by the inverter and then supply converted alternate current power to the power transmitting side resonator 221. The configuration of the power transmission circuit 222 is not limited to the above-mentioned configuration, and may be changed as appropriate according to the type of the power supply 21 or the like.

The ground side communication device 23 is configured to communicate with at least the server 1 and the vehicle 3, and in the present embodiment, is further configured to communicate with other ground power feed devices 2 installed around or within a certain range.

Specifically, the ground side communication device 23 is configured to connect to the network 6 through a wireless base station by accessing the wireless base station connected to the network 6 (see FIG. 1) through a gateway or the like. In this way, wide-area wireless communication is performed between the ground side communication device 23 and the server 1, and various types of information needed to perform contactless power feed to the vehicle 3 are exchanged with the server 1. The wide-area wireless communication is communication with a longer communication distance than short-range wireless communication, which will be described later, and is communication with a communication distance of 10 meters to 10 kilometers, for example. As the wide-area wireless communication, various wireless communication with a long communication distance can be used, for example, communication conforming to any communication standard such as 3GPP (registered trademark) and 4G, LTE, 5G, WiMAX established by IEEE can be used.

The ground side communication device 23 is configured to directly perform short-range wireless communication with a vehicle side communication device 32 mounted on the vehicle 3. The short-range wireless communication is communication with a shorter communication distance than wide-area wireless communication, for example, communication with a communication distance of less than 10 meters. As the short-range wireless communication, various short range wireless communications with a short communication distance can be used, for example, communication conforming to any communication standard established by IEEE, ISO, IEC, or the like (for example, Bluetooth (registered trademark), ZigBee (registered trademark)) can be used. As techniques for performing short-range wireless communication, for example, radio frequency identification (RFID), and dedicated short range communication (DSRC) are used.

In addition, the ground side communication device 23 is configured to perform wireless communication with other ground power feed devices 2 installed around or within a certain range by using a predetermined wireless communication line, and in the present embodiment, is configured to communicate with at least other ground power feed devices 2 installed in front of and behind a device having the ground side communication device 23.

The power transmission control device 20 includes a communication interface 201, a storage 202, and a power transmission processor 203.

The communication interface 201 is a communication interface circuit for connecting the power transmission control device 20 to the internal network 24 of the ground power feed device 2.

The storage 202 has a storage medium such as an HDD, an SSD, an optical recording medium, or a semiconductor memory, and stores various computer programs, data, and the like used for processing in the power transmission processor 203.

The power transmission processor 203 includes one or more central processing units (CPUs) and peripheral circuits thereof. The power transmission processor 203 executes various computer programs stored in the storage 202 to integrally control the overall operation of the ground power feed device 2, and is, for example, a processor. The details of processes executed in the power transmission processor 203 and thus the power transmission control device 20 will be described later with reference to FIGS. 4 and 5.

Figure 3:
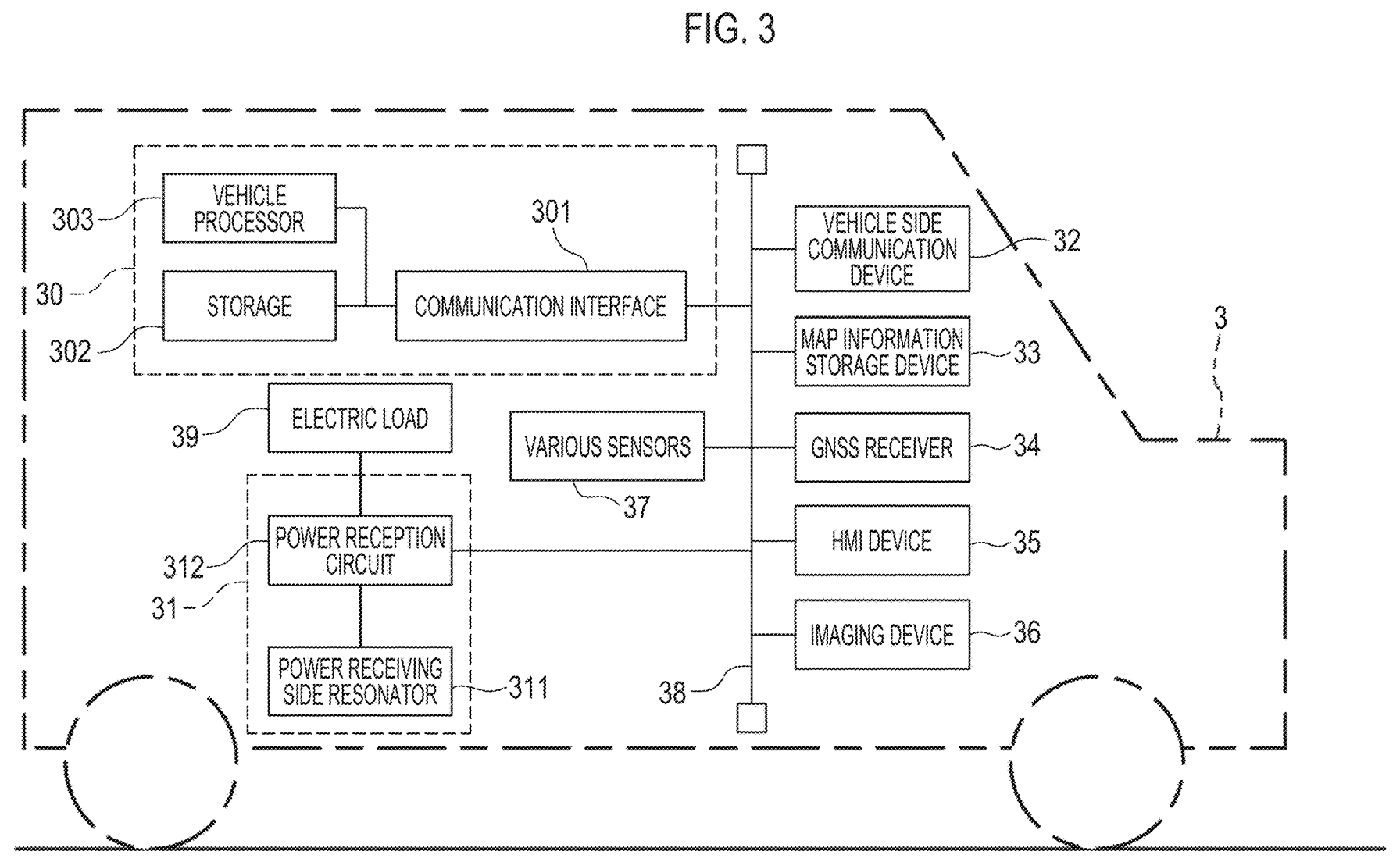

FIG. 3 is a diagram illustrating an example of the configuration of the vehicle 3 according to the present embodiment.

As illustrated in FIG. 3, the vehicle 3 includes the power receiving device 31, the vehicle side communication device 32, a map information storage device 33, a global navigation satellite system (GNSS) receiver 34, a human-machine interface (HMI) device 35, an imaging device 36, various sensors 37, and a vehicle control device 30. The vehicle side communication device 32, the map information storage device 33, the GNSS receiver 34, the HMI device 35, the imaging device 36, and various sensors 37 are connected to the vehicle control device 30 through an in-vehicle network 38 conforming to standards such as CAN.

The power receiving device 31 includes a power receiving side resonator 311 and a power reception circuit 312.

As described above, the power receiving side resonator 311 is a resonance circuit including the power receiving coil, and is configured to resonate at the same resonance frequency $f_0$ as the power transmitting side resonator 221.

The power reception circuit 312 is an electric circuit including a rectifier and a DC-DC converter, and is configured to be controlled by the vehicle control device 30 such that alternate current power output from the power receiving side resonator 311 is converted into direct current power by the rectifier and supplied to an electric load 39 through the DC-DC converter. Examples of the electric load 39 include a battery and an electric motor, but are not particularly limited. In the present embodiment, the power reception circuit 312 is connected to a battery as the electric load 39.

The vehicle side communication device 32 is configured to communicate with at least the server 1 and the ground power feed device 2.

Specifically, the vehicle side communication device 32 is configured to connect to the network 6 through a wireless base station by accessing the wireless base station connected to the network 6 (see FIG. 1) through a gateway or the like. In this way, wide-area wireless communication is performed between the vehicle side communication device 32 and the server 1, and various types of information needed to receive contactless power feed from ground power feed device 2 are exchanged with the server 1.

The vehicle side communication device 32 is configured to directly perform short-range wireless communication with the ground side communication device 23 of the ground power feed device 2.

The map information storage device 33 stores map information including road position information and road type information (for example, information regarding whether the road is a highway or an electrified road).

The GNSS receiver 34 receives radio waves from satellites, specifies the latitude and longitude of the vehicle 3, and detects the current position of the vehicle 3. The GNSS receiver 34 transmits information about the current position of the detected vehicle 3 to the vehicle control device 30.

The HMI device 35 is an interface for exchanging information with a vehicle occupant. The HMI device 35 according to the present embodiment includes a display and a speaker for providing various types of information to the vehicle occupant, and a touch panel for enabling the vehicle occupant to perform information input operations on the display. Of course, instead of the touch panel or in combination with the touch panel, another input device such as an operation button may be provided. The HMI device 35 transmits input information input by the vehicle occupant to various devices that need the input information, and provides the input information to the vehicle occupant, for example, by displaying the information received through the in-vehicle network 38 on the display.

The imaging device 36 captures and outputs an image around the vehicle 3. The image captured by the imaging device 36 is used, for example, by the vehicle control device 30 to detect objects around the vehicle 3.

Various sensors 37 are, for example, sensors such as a traveling load sensor, a vehicle speed sensor, and a wheel speed sensor. The traveling load sensor detects an output voltage proportional to the depression amount of the accelerator pedal as a parameter corresponding to a traveling load. The vehicle speed sensor detects the speed of the vehicle 3. The wheel speed sensor detects the rotational speed of the tire. The sensors are merely examples of sensors, and other sensors may be provided instead of or in addition to the sensors.

The vehicle control device 30 includes a communication interface 301, a storage 302 and a vehicle processor 303.

The communication interface 301 is a communication interface circuit for connecting vehicle control device 30 to in-vehicle network 38.

The storage 302 has a storage medium such as an HDD, an SSD, an optical recording medium, or a semiconductor memory, and stores various computer programs, data, and the like used for processing in the vehicle processor 303.

The vehicle processor 303 includes one or more CPUs and peripheral circuits thereof. The vehicle processor 303 executes various computer programs stored in the storage 302 to integrally control the overall operation of the vehicle 3, and is, for example, a processor. The details of processes executed by the vehicle processor 303 and thus the vehicle control device 30 will be described later with reference to FIGS. 4 and 5.

Figure 4:
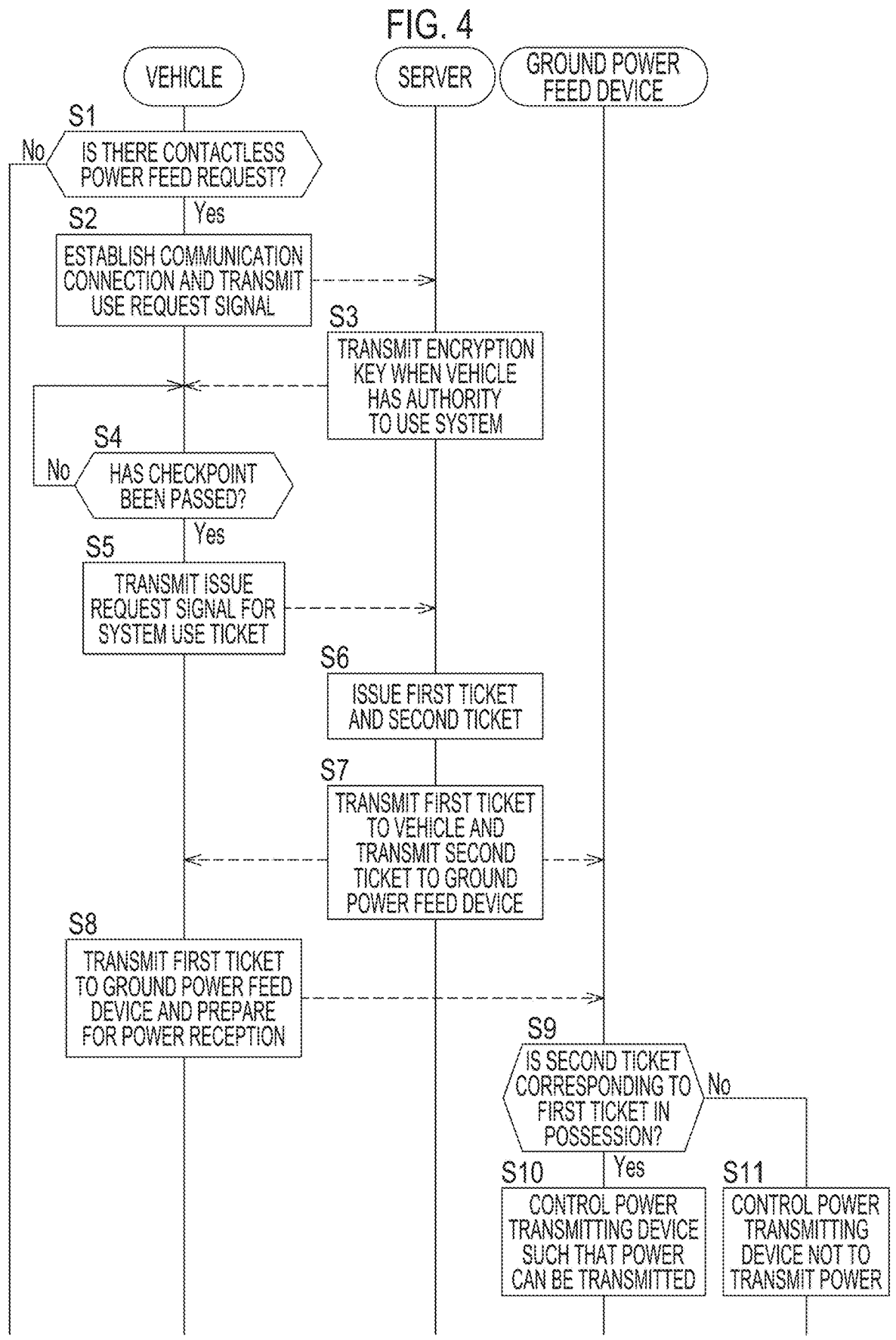
FIG. 4 is an operation sequence diagram for describing details of a process executed in a server, a ground power feed device, and a vehicle to perform contactless power feed.

FIG. 4 is an operation sequence diagram for describing the details of a process (computer program) executed in the server 1, the ground power feed device 2, and the vehicle 3 to perform contactless power feed.

In step S1, the vehicle control device 30 determines whether or not the vehicle 3 (vehicle having the vehicle control device 30) on which the vehicle control device 30 is mounted requests contactless power feed. When the vehicle having the vehicle control device 30 requests contactless power feed, the vehicle control device 30 proceeds to processing of step S2. On the other hand, when the vehicle having the vehicle control device 30 does not request contactless power feed, the vehicle control device 30 ends the current process. In the present embodiment, the vehicle occupant can manually switch between making the request for contactless power feed and not making the request, through the HMI device 35; however, the applicable embodiment is not limited thereto, and making or not making the request for contactless power feed may be automatically switched, for example, according to the charging rate of the battery.

In step S2, the vehicle control device 30 performs, for example, a three-way handshake to establish a communication connection with the server 1, and then transmits a use request signal for the contactless power feed system 100 to the server 1. The use request signal includes, for example, various types of information (such as authentication information) needed to use the contactless power feed system 100.

In step S3, the server 1 checks whether the vehicle 3, which is the transmitter of the use request signal, has the authority to use the contactless power feed system 100 based on the authentication information and the like, and an encryption key for decrypting an encrypted system use ticket is transmitted to the vehicle 3 confirmed as having the authority. The system use ticket is a virtual ticket for using the contactless power feed system 100.

In step S4, the vehicle control device 30 determines whether or not a checkpoint set at any point before an electrified road section has been passed. When the checkpoint has been passed, the vehicle control device 30 proceeds to processing of step S5. On the other hand, when the checkpoint has not been passed, the vehicle control device 30 determines again whether or not the checkpoint has been passed after the predetermined time has elapsed.

Regarding whether or not the checkpoint has been passed, for example, when a gate is installed at the checkpoint, the vehicle control device 30 may receive a signal generated from the gate to determine that the checkpoint has been passed. In this case, the vehicle control device 30 can receive, from the gate, checkpoint information including position information for the passed checkpoint. For example, when the checkpoint information is included in the map information, or when the checkpoint information can be received from the server 1, the vehicle control device 30 may determine that the vehicle has passed through the checkpoint based on position information for the vehicle having the vehicle control device 30 and the position information for the checkpoint. As described above, the method of determining whether or not the checkpoint has been passed is not particularly limited.

In the present embodiment, in step S4 mentioned above, the determination as to whether or not the checkpoint has been passed is made, but the present embodiment is not limited thereto, and a determination may be made as to whether or not a checkpoint has been approached, for example.

As to whether or not the vehicle has approached the checkpoint, for example, when the checkpoint is provided with a device transmitting a signal to the vehicle 3 positioned within a certain range with respect to the checkpoint, the vehicle control device 30 can make a determination by receiving the signal generated by the device, but the present embodiment is not limited thereto, and the determination can be made based on the position information for the vehicle having the vehicle control device 30 and the position information for the checkpoint. For example, when a road section of a predetermined range where signal waiting occurs is an electrified road section such that contactless power feed can be executed for a vehicle waiting for a signal, the certain range with respect to the checkpoint may be some road section before entering the electrified road section.

In step S5, the vehicle control device 30 transmits, to the server 1, an issue request signal for a system use ticket, which is a virtual ticket for using the contactless power feed system 100. The issue request signal for the system use ticket includes identification information for the vehicle having the vehicle control device 30 and checkpoint information.

In step S6, when the server 1 receives an issue request the system use ticket, the server 1 specifies the vehicle 3 that is a requester of the issuance based on vehicle identification information included in the issue request. Then, the server 1 issues a first ticket which is a system use ticket to be transmitted to the vehicle 3, which is the specified requester of the issuance and which is a system use ticket unique to each vehicle 3 having the authority to use the contactless power feed system 100. At the same time, the server 1 issues a second ticket which is a system use ticket corresponding to the first ticket and which is a system use ticket to be transmitted to the ground power feed device 2.

In step S7, the server 1 transmits the encrypted first ticket to the vehicle 3 which is the requester of the issuance of the system use ticket, and transmits the second ticket to each ground power feed device 2 associated with the checkpoint. The ground power feed device 2 associated with the checkpoint is a ground power feed device 2 installed in the electrified road section on which the vehicle 3 that has passed through the checkpoint may travel, and in the server storage 12 of the server 1 according to the present embodiment, for each checkpoint, the ground power feed device 2 associated with the checkpoint is stored in advance.

In step S8, the vehicle control device 30 decrypts the received first ticket by using the encryption key, and starts periodic and direct transmission of a power feed request signal including the decrypted first ticket to the ground power feed device 2, by short-range wireless communication through the vehicle side communication device 32. At the same time, the vehicle control device 30 controls the power transmitting device 22 such that power can be received when the vehicle having the vehicle control device 30 travels on the ground power feed device 2.

In step S9, when the power feed request signal is received with a predetermined communication strength (received signal strength) or more, the power transmission control device 20 determines whether or not the second ticket corresponding to the first ticket included in the power feed request signal has already been received from the server 1, that is, whether or not the second ticket corresponding to the received first ticket is in possession. When the second ticket corresponding to the first ticket is in possession, the power transmission control device 20 proceeds to processing of step S10. On the other hand, when the second ticket corresponding to the first ticket is not in possession, the ground power feed device 2 proceeds to processing of step S11.

In step S10, the power transmission control device 20 determines that the vehicle 3 that is to travel on a ground power feed device having the power transmission control device 20 from now on is a vehicle that requests contactless power feed and has obtained permission to use the contactless power feed system 100 (hereinafter referred to as "power feed target vehicle"), and controls the power transmitting device 22 such that power can be transmitted when the vehicle 3 travels on the ground power feed device having the power transmission control device 20.

In step S11, the power transmission control device 20 of the ground power feed device 2 determines that the vehicle 3 that is to travel on the ground power feed device having the power transmission control device 20 is not a power feed target vehicle, and controls the power transmitting device 22 not to transmit power even when the vehicle 3 travels on the ground power feed device having the power transmission control device 20.

Countermeasure Leakage Magnetic Field

Incidentally, on the electrified road, the vehicle 3 may be difficult to move from the stop position due to some factor, for example, when the vehicle 3 breaks down or gets stranded due to a stuck, or when the vehicle 3 gets caught up in a large-scale vehicle stagnation caused by stranded vehicles due to an accident or bad weather, and so on. In the case described above, when power transmission from the ground power feed device 2 to the vehicle 3 continues, it is likely that, when an occupant gets off the vehicle 3, the occupant is directly exposed to a leakage magnetic field generated during power transmission.

Therefore, in the present embodiment, a determination is made as to whether or not the vehicle 3 gets into a state of being difficult to move on the electrified road, and when the determination can be that the vehicle 3 gets into the state of being difficult to move, the power feed by the ground power feed device 2 can be stopped. In the following, first, with reference to FIG. 5, a method for determining whether or not the vehicle 3 gets into a state of being difficult to move on an electrified road, or the like, will be described.

Figure 5:
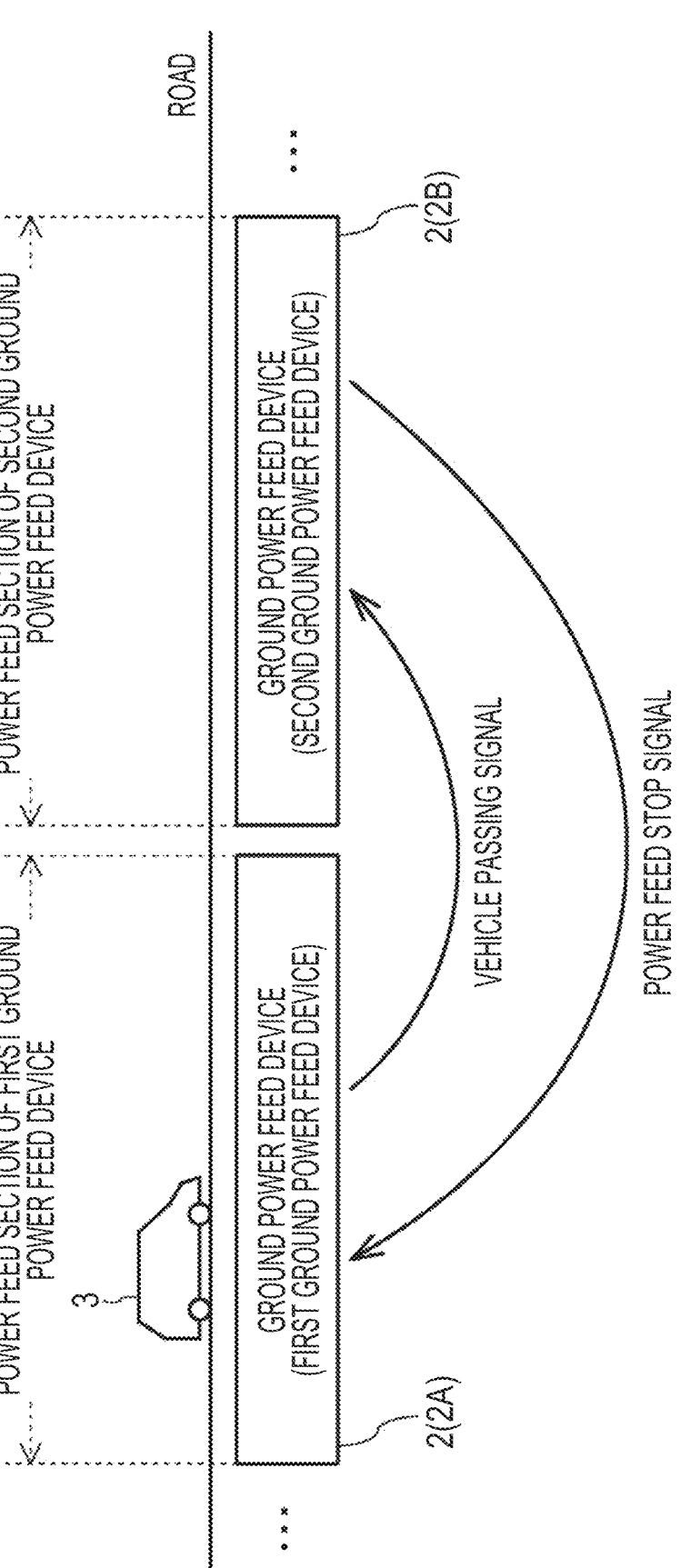
FIG. 5 is a diagram illustrating a state in which the vehicle is stopped due to a failure on the electrified road and gets into a state of being difficult to move.

FIG. 5 is a diagram illustrating a state in which the vehicle 3 is stopped due to a failure on the electrified road and gets into the state of being difficult to move. In the following description, for convenience, as illustrated in FIG. 5, the ground power feed device 2 in which the vehicle 3 is entering the power feed section of the ground power feed device 2 will be referred to as a "first ground power feed device 2A", and the ground power feed device 2 that performs the contactless power feed to the vehicle 3 subsequent to the first ground power feed device is referred to as a "second ground power feed device 2B".

In the present embodiment, the power transmission control device 20 of each ground power feed device 2 is configured to, when entry of the vehicle 3 to the power feed section of the ground power feed device 2 is confirmed, transmit a vehicle passing signal to another ground power feed device 2 located in front in a traveling direction of the vehicle and having a possibility of performing the contactless power feed to the vehicle 3 subsequent to the ground power feed device 2.

Therefore, in the example illustrated in FIG. 5, the power transmission control device 20 of the first ground power feed device 2A, when entry of the vehicle 3 to the power feed section of the first power transmission control device 20 is confirmed, transmits the vehicle passing signal informing about entry of the vehicle 3 to the power feed section of the first ground power feed device 2A to the second ground power feed device 2B that subsequently performs the contactless power feed to the vehicle 3.

The method of determining whether or not the vehicle 3 has entered the power feed section is not particularly limited, and for example, a determination can be made that the vehicle 3 has entered the power feed section by the power transmission to the vehicle 3 being performed after receiving the power feed request signal from the vehicle 3 with a predetermined communication strength or more. Further, for example, when each ground power feed device 2 is provided with an imaging device (not shown) for checking the state of the power feed section of the ground power feed device 2, the determination can be made based on an image captured by the imaging device.

Further, in the present embodiment, the power transmission control device of each ground power feed device 2 is configured to, when confirmation of entry or approach of the vehicle 3 to the power feed section of the ground power feed device 2 having the power transmission control device 20 is not possible even after a predetermined time has elapsed after receiving the vehicle passing signal from another ground power feed device 2 that is located behind the ground power feed device having the power transmission control device 20 in the traveling direction of the vehicle, determine that the vehicle 3 has fallen into the state of being difficult to move in the power feed section of the other ground power feed device 2 (that is, the ground power feed device 2 that has transmitted the vehicle passing signal) behind the ground power feed device having the power transmission control device in the traveling direction of the vehicle. The reason is because, when nothing happens to the vehicle 3, entry or approach to the power feed section of the ground power feed device having the power transmission control device 20 may be able to be confirmed by traveling through the power feed section of the other ground power feed device 2 located behind within the predetermined time.

The predetermined time is set to a value greater than the minimum time taken to travel through the power feed section of the other ground power feed device 2 (in the example shown in FIG. 5, the power feed section of the first ground power feed device 2A) located behind the ground power feed device 2 having the power transmission control device 20 in the traveling direction of the vehicle, for example, can be set in advance based on the distance of the power feed section. Further, for example, when data for the time from when the vehicle passing signal is received until entry or approach of the vehicle 3 to the power feed section of the ground power feed device having the power transmission control device 20 is confirmed (in the example shown in FIG. 5, the data for the time taken for each vehicle 3 to travel through the power feed section of the first ground power feed device 2A) is acquired every time the vehicle passing signal is received, the predetermined time can be set based on a statistical value (average, median, mode, or the like) of the data. For example, when the first ground power feed device 2A has a configuration capable of detecting the speed of the vehicle 3 and the vehicle passing signal includes vehicle speed information for the vehicle 3, the predetermined time can be set based on the vehicle speed information.

In the present embodiment, the power transmission control device 20 of each ground power feed device 2 is configured to transmit a power feed stop signal to another ground power feed device 2 behind the ground power feed device 2 having the power transmission control device 20 in the traveling direction of the vehicle when the determination is made that the vehicle 3 has fallen into the state of being difficult to move in the power feed section of the other ground power feed device 2.

Therefore, in the example shown in FIG. 5, since the vehicle 3 gets into the state of being difficult to move in the power feed section of the first ground power feed device 2A, the power transmission control device 20 of the second ground power feed device 2B cannot confirm entry or approach of the vehicle 3 to the power feed section of the second ground power feed device 2B even after the predetermined time has elapsed after receiving the vehicle passing signal from the first ground power feed device 2A. Therefore, the power transmission control device 20 of the second ground power feed device 2B transmits a power feed stop signal for forcing stop of the contactless power feed to the first ground power feed device 2A.

In this way, it is possible to stop the contactless power feed by the first ground power feed device 2A, and thus it is possible to prevent an occupant of the vehicle 3 from being directly exposed to the leakage magnetic field even when the occupant gets off the vehicle that has fallen into the state of being difficult to move in the power feed section of the first ground power feed device 2A.

Transmission and reception of information (signals) between the first ground power feed device 2A and the second ground power feed device 2B may be performed directly through the ground side communication devices 23 of both of the first ground power feed device 2A and the second ground power feed device 2B, may be performed indirectly through the server 1, or may be performed using a wired line when both of the first ground power feed device 2A and the second ground power feed device 2B are connected by wire. In the present embodiment, communication between the first ground power feed device 2A and the second ground power feed device 2B is performed through the ground side communication devices 23 of both of the first ground power feed device 2A and the second ground power feed device 2B.

Figure 6:
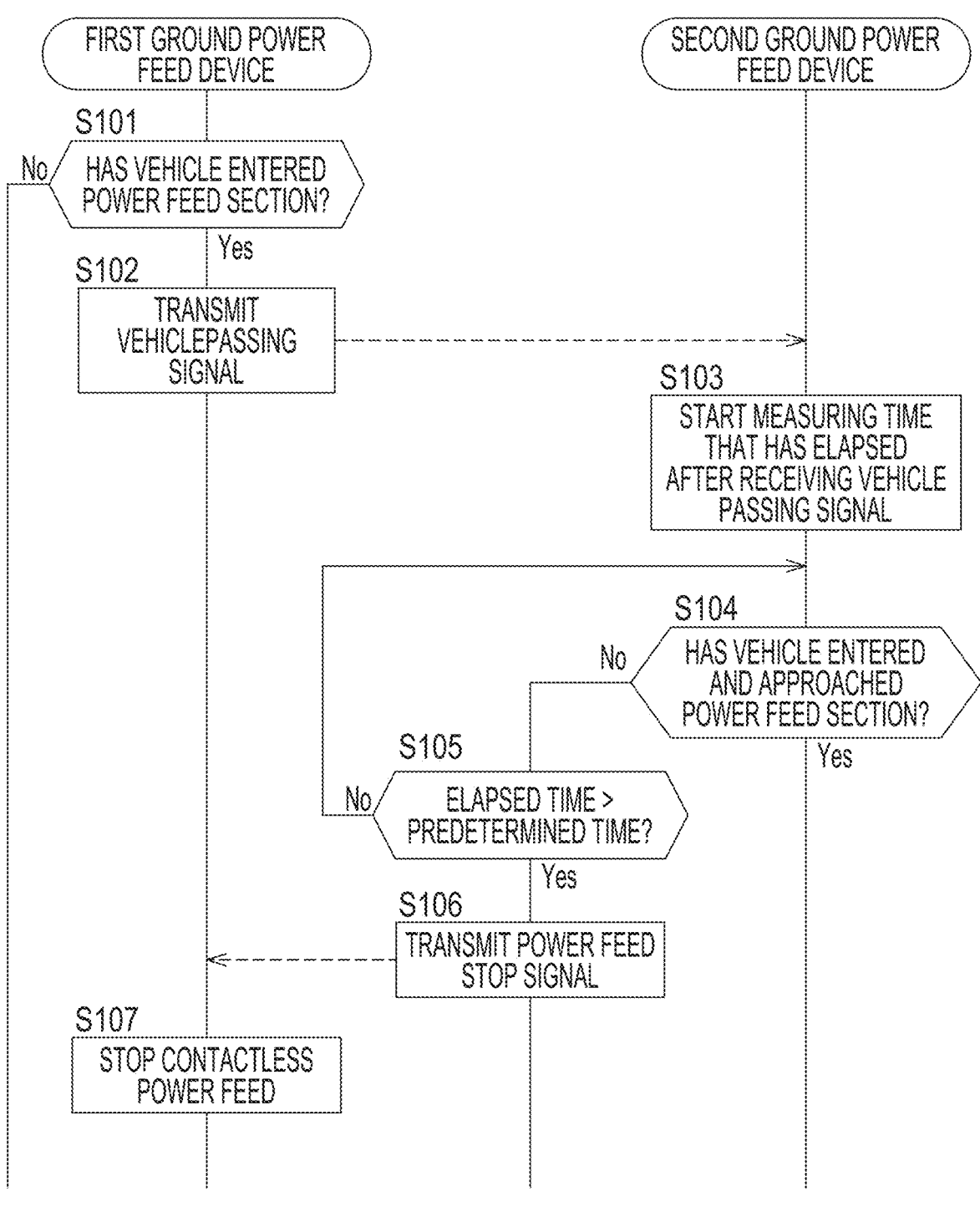
FIG. 6 is an operation sequence diagram for describing details of a process according to the present embodiment executed in the power transmission control device of each of the first ground power feed device and the second ground power feed device to stop contactless power feed when the vehicle has fallen into the state of being difficult to move on an electrified road.

FIG. 6 is an operation sequence diagram for describing details of a process (computer program) according to the present embodiment executed in the power transmission control device 20 of each of the first ground power feed device 2A and the second ground power feed device 2B to stop contactless power feed when the vehicle 3 has fallen into the state of being difficult to move on an electrified road.

In step S101, the first ground power feed device 2A determines whether or not the vehicle 3 has entered the power feed section of the first ground power feed device 2A. The determination is periodically made, for example, and the determination method is as described above. When entry of the vehicle 3 to the power feed section of the first ground power feed device 2A can be confirmed, the first ground power feed device 2A proceeds to processing of step S102. On the other hand, when entry of the vehicle 3 to the power feed section of the first ground power feed device 2A cannot be confirmed, the first ground power feed device 2A ends the process.

In step S102, the first ground power feed device 2A transmits a vehicle passing signal to the second ground power feed device 2B in front. The vehicle passing signal includes passing vehicle specification information for specifying the passing vehicle 3, and in the present embodiment, includes information about a first ticket included in a power feed request signal received from the vehicle 3.

In step S103, when the second ground power feed device 2B receives the vehicle passing signal, the second ground power feed device 2B starts measuring the elapsed time after receiving the signal. Further, the second ground power feed device 2B specifies the vehicle 3 that has entered the power feed section of the first ground power feed device 2A based on vehicle specification information included in the vehicle passing signal.

In step S104, the second ground power feed device 2B determines whether or not a power feed request signal has been received from the vehicle 3 specified in step S103 with a predetermined communication strength or more. In other words, the second ground power feed device 2B determines whether or not the vehicle 3 specified in step S103 has approached the power feed section of the second ground power feed device 2B, and ends the current process by ending the measuring of the elapsed time when approach to the power feed section of the second ground power feed device 2B can be confirmed, or proceeds to processing of step S105 when confirmation of the approach is not possible.

In the present embodiment, the second ground power feed device 2B determines that there is a vehicle 3 approaching the power feed section of the second ground power feed device 2B by receiving the power feed request signal with the predetermined communication strength or more, and furthermore, determines whether or not the first ticket as the vehicle specification information included in the vehicle passing signal received in step S103 and the first ticket included in the power feed request signal received in step S104 are the same ticket. Then, the second ground power feed device 2B determines that the vehicle 3 that has approached the power feed section of the second ground power feed device 2B is the vehicle 3 specified in step S103 when the determination is made that the first ticket as the vehicle specification information included in the vehicle passing signal received in step S103 and the first ticket included in the power feed request signal received in step S104 are the same ticket.

In the present embodiment, as described above, the determination as to whether or not the vehicle 3 has approached the power feed section of the second ground power feed device 2 is made; however, a determination as to whether or not the vehicle 3 has entered the power feed section of the second ground power feed device 2 may be also made. In making determinations in the present embodiment, the determination as whether or not the vehicle 3 has approached the power feed section of the second ground power feed device 2 is easier, since the determination as to whether or not the vehicle 3 has approached the power feed section of the second ground power feed device 2 can be simply made from receiving the power feed request signal with a predetermined communication strength or more. Further, when the power feed request signal is received with the predetermined communication strength or more, a determination can be made that the vehicle is sufficiently approaching the power feed section of the second ground power feed device 2 and will enter the power feed section with certainty.

In step S105, the second ground power feed device 2B determines whether or not the elapsed time after receiving the vehicle passing signal has exceeded a predetermined time. When the elapsed time after receiving the vehicle passing signal has exceeded the predetermined time, the second ground power feed device 2B proceeds to processing of step S106. On the other hand, when the elapsed time after receiving the vehicle passing signal is within the predetermined time, the second ground power feed device 2B returns to processing of step S104 after a predetermined interval.

In step S106, the second ground power feed device 2B transmits a power feed stop signal to the first ground power feed device 2A.

In step S107, when the first ground power feed device 2A receives the power feed stop signal, the first ground power feed device 2A stops the contactless power feed in the power feed section of the first ground power feed device 2A.

The contactless power feed system 100 according to the present embodiment described above includes the first ground power feed device 2A and the second ground power feed device 2B that has the possibility of performing the contactless power feed to the vehicle 3 subsequent to the first ground power feed device 2A, as the ground power feed device 2 for performing the contactless power feed to the vehicle 3 (moving body). Then, the first ground power feed device 2A is configured to, when entry of the vehicle 3 to the first power feed section in which the contactless power feed is performed by the first ground power feed device 2A is confirmed, transmit, to the second ground power feed device 2B, a vehicle passing signal informing about passage of the vehicle 3. The second ground power feed device 2B is configured to, when confirmation of entry or approach of the vehicle 3 to the second power feed section in which the contactless power feed is performed by the second ground power feed device 2B is not possible even after the predetermined time has elapsed after receiving the vehicle passing signal, transmit, to the first ground power feed device 2A, a power feed stop signal for stopping the contactless power feed in the first power feed section.

In this way, when the vehicle 3 gets into the state of being difficult to move in the first power feed section of the first ground power feed device 2A, an instruction to the first ground power feed device 2A from the second ground power feed device 2B for stopping power feed is performed, which can stop the contactless power feed by the first ground power feed device 2A. Therefore, even when the occupant gets off the vehicle 3 that has fallen into the state of being difficult to move in the power feed section of the first ground power feed device 2A, it is possible to prevent the occupant from being directly exposed to the leakage magnetic field.

The predetermined time can be set, for example, based on the distance of the first power feed section. Further, for example, the predetermined time can be set based on the statistical value of data on a time taken for a plurality of vehicles 3 that has traveled in the first power feed section in the past to travel through the first power feed section. In this way, it is possible to precisely ascertain the time normally taken to travel through the first power feed section, and thus it is possible to get around erroneous determination that the vehicle 3 has fallen into the state of being difficult to move in the first power feed section of the first ground power feed device 2A, even though the vehicle 3 has not fallen into the state of being difficult to move in the first power feed section of the first ground power feed device 2A.

The ground power feed device 2 according to the present embodiment for performing contactless power feed to the vehicle 3 (moving body) is configured to, when entry of the vehicle 3 to a power feed section in which contactless power feed is performed by the ground power feed device 2 is confirmed, transmit a vehicle passing signal informing about passage of the vehicle 3 to another ground power feed device 2 located in front in the traveling direction of the vehicle 3 and having a possibility of performing the contactless power feed to the vehicle 3 subsequent to the ground power feed device 2. Further, the ground power feed device 2 is configured to, when the vehicle passing signal is received from the other ground power feed device 2 located behind in the traveling direction of the vehicle 3, transmit a power feed stop signal for stopping the contactless power feed to the other ground power feed device 2 located behind in the traveling direction of the vehicle 3 when confirmation of entry or approach of the vehicle 3 to the power feed section is not possible even after a predetermined time has elapsed after receiving the vehicle passing signal. Then, the ground power feed device 2 is configured to, when the power feed stop signal is received from the other ground power feed device 2 in front in the traveling direction of the vehicle 3, stop the contactless power feed in the power feed section of the ground power feed device 2.

By configuring each ground power feed device 2 as described above, it is possible to stop the contactless power feed in the power feed section of each ground power feed device 2 when the vehicle 3 gets into the state of being difficult to move in the power feed section.

Although the embodiments of the present disclosure have been described above, the above embodiments merely show a part of application examples of the present disclosure, and are not intended to limit the technical scope of the present disclosure to the specific configurations of the embodiments.

For example, as illustrated in FIG. 7, when an electrified road branches at a branch point and there is a plurality of second ground power feed devices 2B that has the possibility of performing the contactless power feed to the vehicle 3 subsequent to the first ground power feed device 2A, a vehicle passing signal may be transmitted to the second ground power feed devices 2B that have the possibility, and a power feed stop signal may be transmitted from the second ground power feed devices 2B to the first ground power feed device 2A when a time that has elapsed after receiving the signal exceeds a predetermined time. Furthermore, when any of the second ground power feed devices 2B can confirm entry or approach of the vehicle 3 to the power feed section of the second ground power feed devices 2B, measurement of the elapsed time at each second ground power feed device 2B may be ended by performing communication between the second ground power feed devices 2B.

Further, for example, as described with reference to FIG. 6, in order to stop contactless power feed when the vehicle 3 has fallen into the state of being difficult to move on an electrified road, a part of the processing performed by the power transmission control devices 20 of the ground power feed devices 2 (the first ground power feed device 2A and the second ground power feed device 2B) may be modified to be performed by the server 1.

Further, for example, as described with reference to FIG. 6, in order to stop contactless power feed when the vehicle 3 has fallen into the state of being difficult to move on an electrified road, each computer program executed in the power transmission control devices 20 of the ground power feed devices 2 (the first ground power feed device 2A and the second ground power feed device 2B) may be provided in a form recorded on a computer-readable portable recording medium such as a semiconductor memory, magnetic recording medium, or optical recording medium.

What is claimed is:

1. A contactless power feed system comprising a first ground power feed device and a second ground power feed device configured to perform contactless power feed to a moving body, wherein:

the second ground power feed device is a ground power feed device that has a possibility of performing the contactless power feed to the moving body subsequent to the first ground power feed device;

the first ground power feed device is configured to transmit, to the second ground power feed device, a passing signal informing about passage of the moving body when entry of the moving body to a first power feed section in which the contactless power feed is performed by the first ground power feed device is confirmed; and the second ground power feed device is configured to transmit, to the first ground power feed device, a power feed stop signal for stopping the contactless power feed in the first power feed section when confirmation of entry or approach of the moving body to a second power feed section in which the contactless power feed is performed by the second ground power feed device is not possible even after a predetermined time has elapsed after receiving the passing signal.

2. The contactless power feed system according to claim 1, wherein the predetermined time is set based on a distance of the first power feed section.

3. The contactless power feed system according to claim 1, wherein the predetermined time is set based on a statistical value of a time taken for a plurality of the moving bodies that has traveled in the first power feed section in past times to travel through the first power feed section.

4. The contactless power feed system according to claim 1, wherein the first ground power feed device is configured to stop the contactless power feed in the first power feed section when the power feed stop signal is received.

5. A ground power feed device that performs contactless power feed to a moving body, the ground power feed device comprising a processor configured to receive a passing signal informing about passage of the moving body from another ground power feed device behind in a traveling direction of the moving body, and when the passing signal is received from the other ground power feed device, transmit, to the other ground power feed device, a power feed stop signal for stopping the contactless power feed when confirmation of entry or approach of the moving body to a power feed section is not possible even after a predetermined time has elapsed after receiving the passing signal.

6. A contactless power feed method that is executed by a first ground power feed device configured to perform contactless power feed on a moving body and a second ground power feed device that is a ground power feed device that has a possibility of performing the contactless power feed to the moving body subsequent to the first ground power feed device, the contactless power feed method comprising:

transmitting a passing signal informing about passage of the moving body from the first ground power feed device to the second ground power feed device when entry of the moving body to a first power feed section in which the contactless power feed is performed by the first ground power feed device is confirmed;

transmitting, when the second ground power feed device receives the passing signal from the first ground power feed device, a power feed stop signal for stopping the contactless power feed from the second ground power feed device to the first ground power feed device when confirmation of entry or approach of the moving body to a second power feed section in which the contactless power feed is performed by the second ground power feed device is not possible even after a predetermined time has elapsed after receiving the passing signal; and stopping the contactless power feed in the first power feed section when the first ground power feed device receives the power feed stop signal from the second ground power feed device.

* * * * *